Jan. 24, 1961 W. LEPPER 2,968,970

COMPENSATION OF UNBALANCE IN CENTRIFUGAL MACHINES

Filed Oct. 13, 1958 7 Sheets-Sheet 1

Inventor:
W. Lepper
By Glascock Downing & Seebold
Attys.

Inventor:
W. Lepper
By Glascock Downing & Seebold
Attys.

Jan. 24, 1961 W. LEPPER 2,968,970

COMPENSATION OF UNBALANCE IN CENTRIFUGAL MACHINES

Filed Oct. 13, 1958 7 Sheets-Sheet 3

Inventor:
W. Lepper
By Glascock Downing & Seebold
Attys.

Inventor:
W. Lepper
By Glascock Downing & Seebold
Attys.

Jan. 24, 1961 W. LEPPER 2,968,970

COMPENSATION OF UNBALANCE IN CENTRIFUGAL MACHINES

Filed Oct. 13, 1958 7 Sheets-Sheet 5

Inventor
W. Lepper
By Glascock Downing & Seebold
Attys.

Inventor:
W. Lepper
By Glascock Downing & Seebold
Attys.

Inventor:
W. Lepper
By Glascock Downing & Seebold
Attys.

United States Patent Office 2,968,970

Patented Jan. 24, 1961

2,968,970

COMPENSATION OF UNBALANCE IN CENTRIFUGAL MACHINES

Wilhelm Lepper, Berghaus Heckenfels, Honnef (Rhine), Germany

Filed Oct. 13, 1958, Ser. No. 766,734

Claims priority, application Germany Oct. 19, 1957

4 Claims. (Cl. 74—573)

The present invention relates principally to a method of reducing the out-of-balance load transmitted to its bearings by an unbalanced rotating body in which the eccentricity of the centre of gravity in relation to the axis of revolution varies during rotation. The invention further relates to apparatus for performing the method and more particularly to a washing machine and/or centrifugal drier comprising a rotatably driven supporting member mounted in bearings for the suspension therein of an unbalanced body revolving in synchronism therewith, such as more particularly the basket or perforated drum of a washing machine.

Two methods are known of dealing with the problem of reducing or eliminating the effect of unbalance of bodies revolving about an axis which does not contain their centre of gravity.

(*a*) The method of static balancing by the provision of balancing masses or counterweights affixed in positions on the rotating body diametrically opposite the seat of unbalance for the purpose of moving the centre of gravity into the axis of revolution;

(*b*) The method which consists in reducing the forces which act on the bearings as a result of unbalance by giving the axis of rotation considerable freedom of movement so that the axis of revolution can automatically adjust itself to a position in which it will at least approximately pass through the centre of gravity.

Whereas static balancing, as performed in practice on balancing machines, permits unbalance to be substantially completely eliminated, even when the axis of revolution is rigid, always providing the distribution of mass and the position of the axis of revolution remain unchanged after balance has been achieved, the reduction of the forces due to unbalance by giving freedom of movement to the axis of revolution will as a rule be only partly successful since for structural reasons the provision of complete freedom of movement is usually impracticable.

On the other hand, static balancing in a balancing machine ceases to be applicable to revolving masses in which the degree of unbalance is liable to change in operation, as will be the case for instance in washing machines and centrifugal driers in which the irregular position of the charge in the basket or drum gives rise to unbalance of varying magnitude which cannot be eliminated by counterweights or balancing masses affixed in definite positions on the rotating drum.

The method proposed by the present invention and the construction of the apparatus for performing the method, whereby the forces which act on the bearings of a body revolving with a varying degree of unbalance can be very largely reduced, is based substantially upon the principle of static balancing.

The novel method is characterized in that a carrier cage is interposed between the rotating body and its bearings, said carrier cage transmitting the torque to the rotating body and also serving for the suspension thereof in a manner permitting radially yielding displacement from concentricity with the carrier cage which rotates in synchronism therewith, in such a way that any such radial displacement, caused by unbalance of the revolving body, out of concentricity with the axis of revolution of the carrier cage and against the restoring force of the suspension, will entrain a displacement in the opposite direction of a compensating mass, likewise suspended in the carrier cage in a manner permitting its radially yielding displacement from a concentric position, so that the out-of-balance forces transmitted through the carrier cage to the bearings will be at least partly compensated.

In the proposed elastically yielding suspension of a revolving body which possesses an out-of-balance excess weight producing unbalance in a given direction, such as of an unbalanced washing or centrifugal drier basket, by means of elastically yielding elements which bear on a carrier cage driven by drive means and entraining the body or basket in synchronous rotation, the elastic eccentric displacement, due to unbalance, of the revolving body in relation to the carrier cage which revolves at the same angular speed—said displacement initially increasing the degree of unbalance—provides a measure for the magnitude, and determines the direction, of the unbalance, and hence a control quantity, namely the amount of eccentric displacement (arising as the integral of the momentary product of the difference between the displacing and the restoring force, on the one hand, and the displacement differential on the other) which, according to the invention, can now be used for displacing a compensating mass which is likewise suspended in radially elastically yielding manner in the carrier cage.

The displacement of the centre of gravity of the compensating mass from a previously concentric position—from which it is displaced in a direction opposed to the direction of displacement of the unbalanced body—gives rise to a centrifugal force which opposes the centrifugal out-of-balance force generated by the unbalanced body, and it is therefore possible by matching the compensating centrifugal force with the quantity which characterises the degree of unbalance of the revolving body to compensate or at least substantially reduce the resultant unbalance of the entire system comprising the revolving body, the compensating mass, and the carrier cage.

Consequently, the out-of-balance forces transmitted to the bearings of the carrier cage will be suppressed or largely eliminated, so that the bearings as well as a casing containing the carrier cage which drives the revolving body suspended therein will not be subjected to considerable stresses due to unbalance.

To permit the eccentric displacement of the compensating mass to be matched with the degree of unbalance of the out-of-balance revolving body it is preferred to couple the latter positively with the compensating mass in such a manner as to coordinate opposed displacements of the unbalanced body and the compensating mass in relation to the axis of revolution of the carrier cage. In the further development of the idea underlying the invention this can be done by coupling means which provide a transmission ratio that associates small displacements of the unbalanced body with large displacements of the compensating mass.

The build-up of undesirable resonant vibrations of the unbalanced body in its carrier cage can be suppressed if at least one of the displaceable bodies or masses i.e. either the unbalanced body, say a washing basket, or the compensating mass, is subjected to frictional damping.

The apparatus for performing the method proposed by the present invention, which may be more particularly a washing machine and/or a centrifugal drier comprising a rotatably driven carrier cage mounted in bearings for the suspension therein of an unbalanced body revolving in synchronism therewith, such as a washing basket, is characterised in that said body, for instance, the washing basket, is suspended within the carrier cage in a manner permitting radially yielding displacement from a concentric position and co-operates with a compensating mass likewise suspended in a manner permitting radially yielding displacement from a concentric position, against the restoring force of the suspension, in such manner that the radial eccentric displacement of the unbalanced body, viz. washing basket, in one direction will cause a corresponding countervailing radial eccentric displacement of the compensating mass in the opposite direction.

Other features and technological advantages of the method proposed by the invention and of apparatus for performing the same will now be described with reference to a number of embodiments of apparatus as illustrated by the accompanying drawings in which Fig. 1 is a schematic axial section of a washing machine comprising a vertically mounted washing and drying basket, when stationary;

Figure 8:
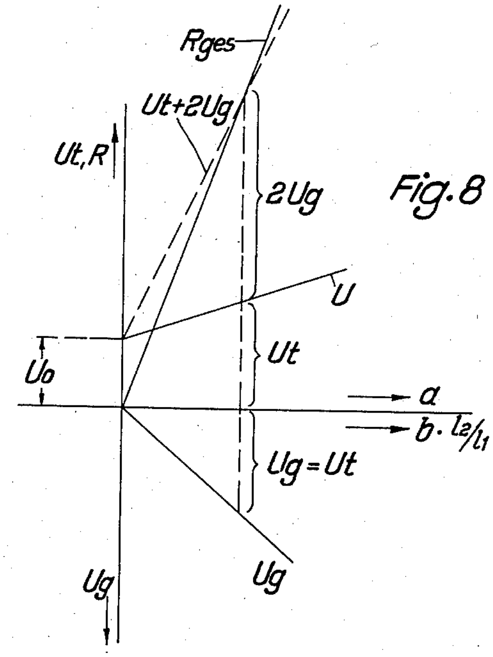
Fig. 8 is a diagram which represents the relationship between the out-of-balance and restoring forces.
Figure 8A:
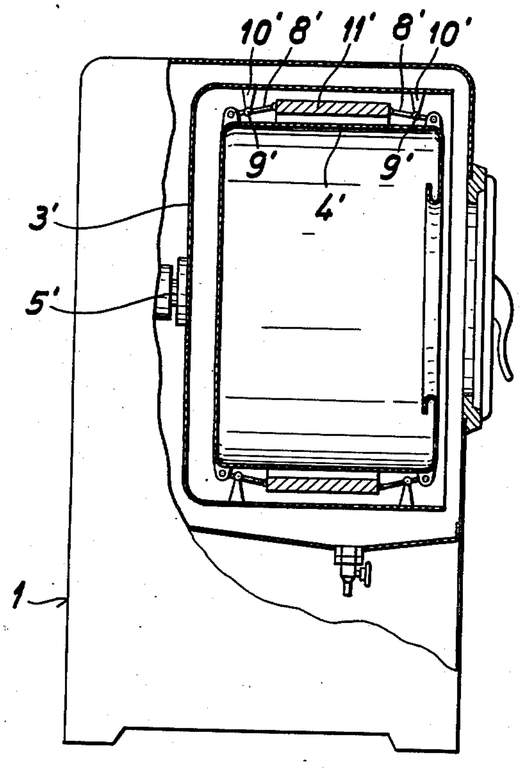
Figure 9:
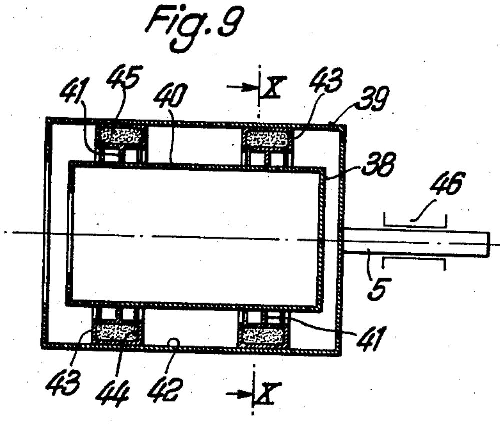
Figure 10:
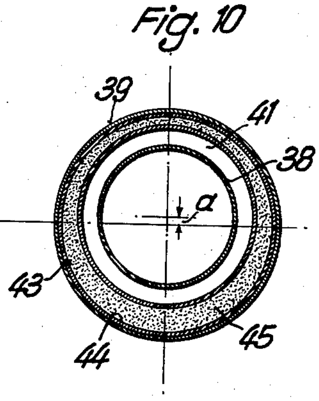
Figure 11:
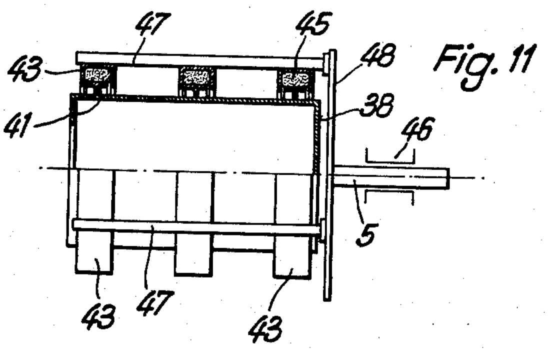
Figure 12:
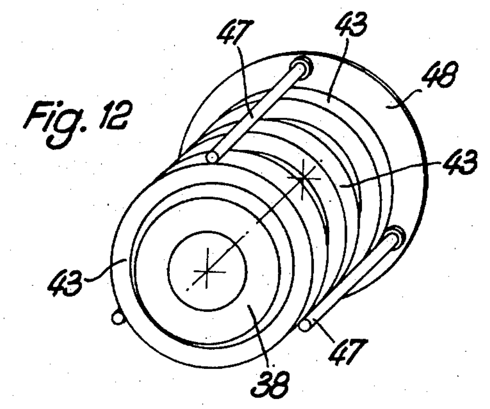
Figure 13:
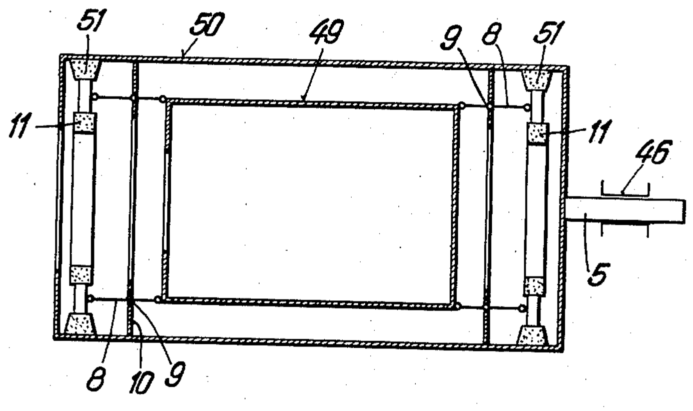
Figure 14:
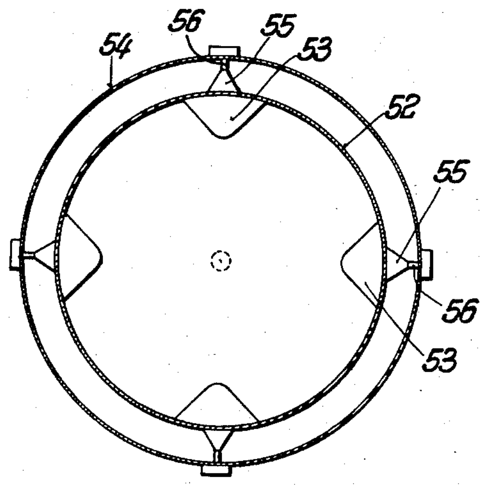

Fig. 8*a* is a part-sectional elevation of another form of washing machine constructed in accordance with the invention;

Fig. 9 is a schematic longitudinal section of a modified form of construction of the suspension of a horizontal washing basket in the carrier cage;

Fig. 10 is a cross section taken on the line X—X in Fig. 9, showing the washing basket in an eccentrically displaced position;

Fig. 11 is a part sectional view of another method of suspending the basket inside the carrier cage;

Fig. 12 is a perspective view of a basket and carrier cage as shown in Fig. 11;

Fig. 13 is an axial section of yet another type of suspension of the basket, and Fig. 14 is a schematic cross section of a washing basket inside a carrier cage in which unbalance is compensated by the partial discharge of liquid from balancing tanks.

The washing machine and centrifugal drier with a vertical washing basket formed as a rotary body as illustrated in Figs. 1 to 4 comprises a base 1 containing a motor 2 for driving, through a shaft 5, a carrier cage 3 formed as a drum in which is suspended the basket 4 for the reception of the washing that is to be laundered. The washing basket 4 is suspended coaxially with the axis of rotation 6 of the carrier cage 3 and held by elastically yielding locating members 7 which are evenly distributed around the periphery of the basket. These elastically yielding locating members 7 may have the form of compression or tension springs or they may be rubber-elastic elements. Their only purpose is to permit the washing basket 4 to yield radially in relation to the axis of revolution 6 of the carrier cage 3 and to produce restoring forces which increase in magnitude with increasing eccentric displacement of the basket and urge it back into its central or coaxial position with the carrier cage 3.

Figure 1:
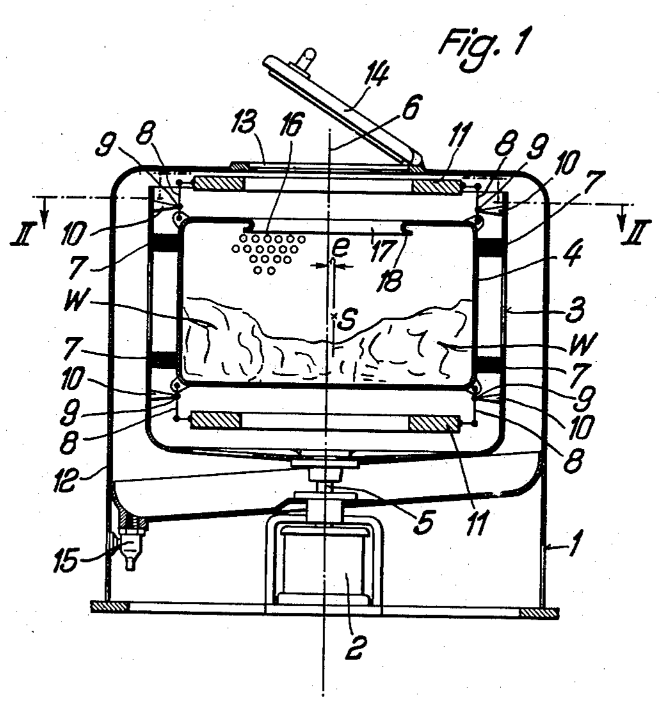
Figure 2:
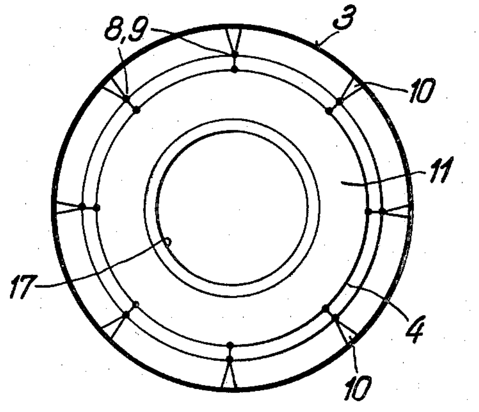
Fig. 2 is a diagrammatic cross sectional representation in the plane indicated by II—II in Fig. 1, confined to illustrating the internal system of the washing machine.

Each end of the washing basket is suspended between equal arms of double-armed levers 8 extending approximately parallel with the axis of revolution 6, said levers being equidistantly spaced around the peripheral edge at both ends of the basket 4 and fulcrumed at 9 on brackets 10 affixed to the carrier cage 3. The free arms of the double-armed levers 8 are linked to ring-shaped counterweights 11 in such manner that the lever assemblies 8 provide a positive though flexible coupling between basket 4 and the counterweights, permitting radial deflections in relation to the axis of revolution 6. These counterweights 11 are likewise urged by the elastically yielding locating members 7 into concentric alignment with the axis of revolution when the machine is at rest, in such manner that in the inoperative machine the centres of gravity of the empty washing basket 4 and of the counterweights 11 will be located exactly in the axis of revolution 6 of the intermediate cage 3. In Fig. 2 the concentricity of these members is clearly shown.

The cage 3, the washing basket 4, and the counterweights 11, together with the elastically yielding locating members 7 and the two annular assemblies of double-armed levers 8, are all contained inside an outer tank 12 of the washing machine which during the washing process holds the washing liquor and which is provided at the top with an opening 13 which can be closed in conventional manner by a cover plate 14. At the lowest point at the bottom of the tank is a drain cock 15.

The washing basket 4 consists of a perforated cylindrical sheet metal shell (holes 16), the top end having a central opening 17 with an inwardly curved lip 18.

When the machine is to be used the normal procedure is for the washing to be dumped into the basket 4 so that it cannot be expected that its distribution inside the basket will be symmetrical. When the washing and rinsing operations have been performed and the tank 12 is empty the greater part of the washing will be found to lie around the sides of the basket 4.

Figure 3:
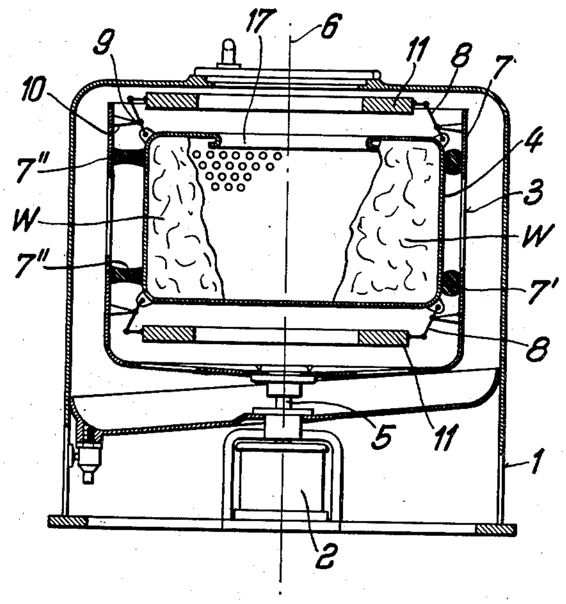
Fig. 3 is an axial section, similar to that shown in Fig. 1, of the washing machine, when in action as a centrifugal drier, showing the members of the revolving assembly in positions they might occupy in the event of the revolving basket being considerably out of balance.

When the washing W is centrifugally dried by the action of expelling the moisture contained therein by centrifugal forces, the washing is forced tightly against the wall of the basket in irregular heaps. The centre of gravity S of the basket 4 including the washing contained therein is then unlikely to be still exactly located in the axis of revolution 6 of the cage 3 and may be displaced for instance by an amount *e*. In other words the basket will be unbalanced and give rise to a revolving couple which increases in magnitude with increasing angular speed and which tends to throw the basket radially outwards in the direction in which the excess weight is located as shown in Fig. 3. The resultant displacement of the basket causes the elastically yielding locating members 7 to be compressed on the side where the source of unbalance is situated (cf. members 7′ in Fig. 3) and to be expanded and relieved on the opposite side (cf. members 7″ in the same figure). However, in virtue of the double-armed lever assembly 8 the radial displacement of basket 4 will at the same time cause the counterweights 11 to be radially displaced in a direction which is opposed to the direction of displacement of the basket. Since the counterweights 11 are linked to the longer arms of the double-armed levers, their displacement will be greater than that of the basket in proportion with the lever ratio of the double-armed levers. Consequently, the displacement of the centre of gravity S′ of the counterweights will give rise to a couple which exactly opposes the couple generated by the displacement of the centre of gravity S of the basket. The double-armed levers 8 transmit the resultant forces through their brackets 10 to the cage 3 where the two couples will balance and permit the cage 3 to revolve smoothly without transmitting vibrations to other members of the washing machine.

Figure 4:
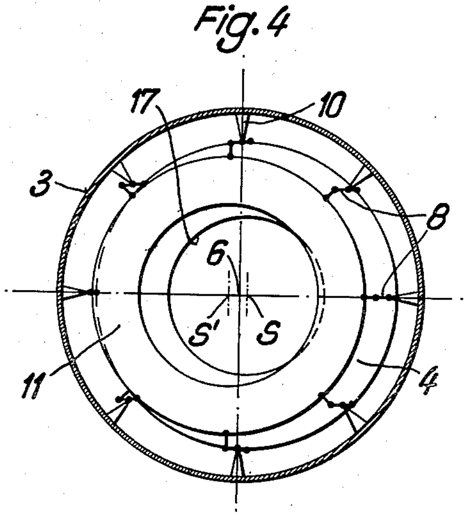
Fig. 4 is a sectional view, corresponding with that shown in Fig. 2, but showing the machine in action, as in Fig. 3.

Fig. 4 illustrates the positions of the washing basket 4 and of the counterweights 11 during the centrifugal drying operation, assuming that the distribution of the washing in the basket 4 has produced a considerable degree of unbalance.

The new method as applied to a washing machine with a vertical axis, as has been described, can be as readily applied to a washing machine with a horizontal axis—as will be at once understood. The structural elements that have been described could be adapted to such a machine with practically no modification.

Figures 5, 6:
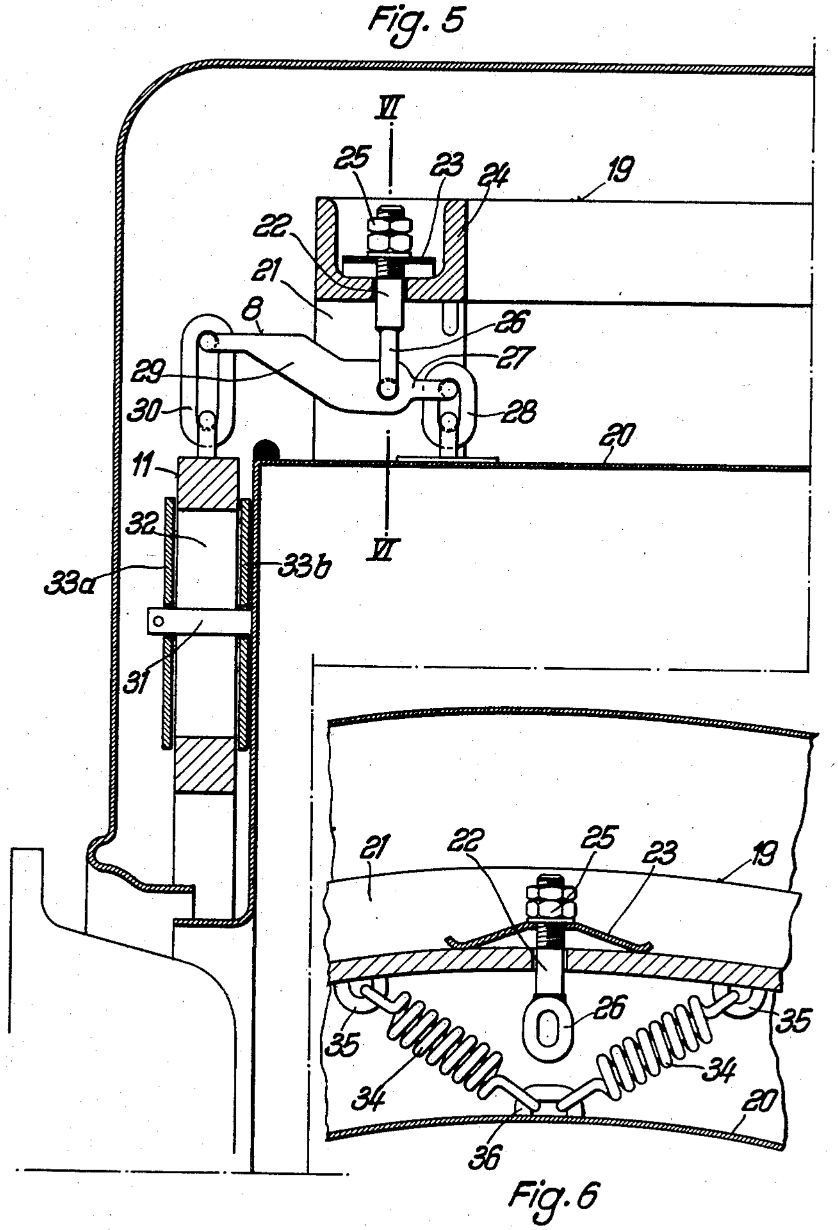
Fig. 5 is a part sectional elevation on a larger scale of a washing machine with a horizontally mounted basket, showing means of coupling the basket with a counterweight.
Fig. 6 is a simplified section of a detail, taken on the line VI—VI in Fig. 5.

Figs. 5 and 6 exemplify a possible arrangement of the lever assemblies in a washing machine with a horizontal basket as well as the disposition of the counterweights and the elastically yielding locating members around the periphery of the basket.

The carrier cage between drive means and basket for suspending the basket 20 is in this case embodied in a profiled steel cage 19 comprising a channel-section steel ring 21 from which eyelet bolts 22 project radially; these bolts support the double-armed levers 8. Arched leaf springs 23 are interposed on the bolts between the nuts and the bearing surface formed by the base of the channel-sectioned ring 24. The springs can be compressed as desired by tightening the nuts 25. Each bolt carries a double-armed lever 8 suspended in the eye 26 of the bolt. The shorter arm 27 of the lever carries a link 28 which supports the horizontal cylindrical basket 20; the longer arm 8 likewise carries a link 30 on which the annular counterweight 11 is suspended. The counterweight is displaceably held by means of pins 31 welded to the end of the basket; these pins project through circular apertures 32 in the counterweight 11 and carry circular plates 33*a* and 33*b* which prevent the counterweight from axially shifting without at the same time interfering with its freedom of radial movement in every direction.

The elastically yielding members for locating the basket 20 are embodied in pairs of angularly placed helical springs 34 linked at one end to eyelets 35 on the profiled steel cage 19 and at the other end to an eyelet 36 secured to the basket 20.

By tightening the nuts 25 on the eyelet bolts 22 the basket 20 together with the counterweights 11 can be tightly suspended in the interior of cage 19. The transmission system between basket 20 and counterweight 11 must be thus tightly suspended without radial play to ensure that the opposed displacements of basket 20 and counterweights 11 will be functionally positively controlled.

Figure 7:
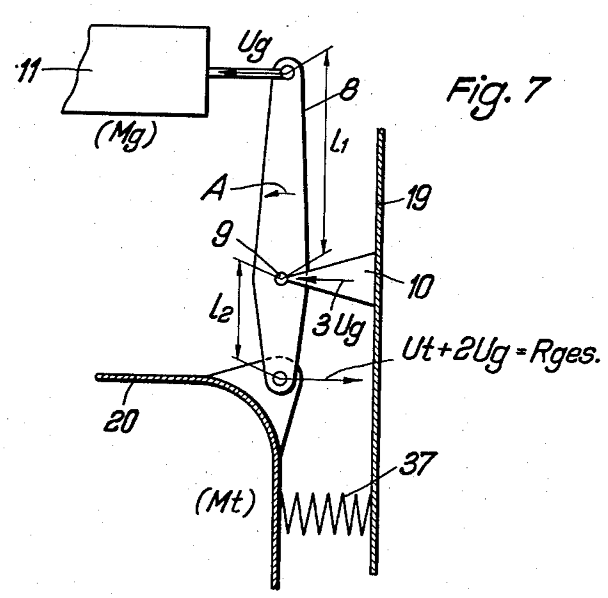
Fig. 7 is a diagrammatic representation of the lever linkage employed in Fig. 5, illustrating the mode of action of the suspension.

The manner in which the balancing device illustrated in Figs. 1 to 6 functions will now be described in greater detail by reference to Figs. 7 and 8 of the drawings. Fig. 7 in simplified form shows the linkage between the washing basket 20, the driven member which intermediately transmits rotation to the basket suspended therein and which is embodied for instance in a cage 19, and one of the counterweights 11. One of the elastically yielding locating members 7 for locating the basket 20 in relation to the cage 19 is represented by a helical spring 37. The arms of the double-armed lever 8 are indicated by $l_1$ and $l_2$.

When the washing basket 20 is in rapid rotation and an asymmetrical distribution of the washing contained therein has caused the centre of gravity to be shifted away from the axis of revolution of cage 19 in which the basket is suspended, the basket will be thrown radially outwards, as has been explained, owing to the generation of a force U*t* which causes spring 37 to be compressed.

The radial displacement of the basket 20 which will hereinafter be designated by *a* causes the double-armed lever 8 to tilt in the direction indicated by arrow A, thus displacing the counterweight 11 in the opposite direction to the direction of displacement of the basket in relation to fulcrum 9 which is rigidly connected with cage 19. Assuming that the centre of gravity of the basket including the washing contained therein has moved by an amount *e* away from the axis of revolution, and denoting the total mass of the basket 20, inclusive of washing, by M*t* then the force acting radially outwards as the result of the unbalance of the basket—before this has been displaced—will be $$Uo=mt.e\omega^2$$

if the angular speed of revolution is $\omega$.

If this radial force now displaces the basket by an amount *a*, then the radial force U will further increase with increasing displacement *a* because the centre of gravity of the basket including its contents will move still further away from the axis of revolution. The actual out-of-balance force will then be $$U=Mt.(e+a).\omega^2$$

The opposing forces generated in springs 37 absorb this force which tends to displace the basket.

However, at the same time as basket 20 is thus displaced the double-armed levers 8 cause the counterweight 11 to be displaced in the opposite direction, the displacement of the counterweight being greater in proportion with the transmitting lever ratio. The displacement of the counterweight will therefore be $$b=a\cdot\frac{l_1}{l_2}$$

The mass M*g* of the counterweight will thus be subject to a centrifugal force which opposes the out-of-balance force acting on the basket, and this centrifugal force will be determined by $$U_g=M_g.b.\omega^2$$

Assuming the lever ratio to be 2:1, then this "compensating centrifugal force" U*g* will be re-transmitted through lever 8 and give rise at the end of the shorter lever arm to a force 2U*g* which the latter applies to the basket 20 which in turn will transmit the same to the springs 37 so that—in conformity with the lever laws—a force of 3U*g* will act on pivot 9 and a force of 2U*g* on the spring members 37.

The springs 37 which act as elastically yielding locating elements will therefore be compressed, and on the opposite side of the basket relieved or expanded, until their combined restoring forces $R_{ges}$ are in equilibrium with the sum of the forces $Ut+2Ug$. This will be the case when the forces at the joints 9 ($3Ug$) and the forces $Ut+2Ug$ acting on the springs 37 are equal, that is to say when $Ug$ equals $Ut$.

When this is the case the force $Ut$ due to the unbalance of basket 20 and the opposing force $Ug$ generated by the displacement of the counterweight 11 will exactly compensate in their effect upon the cage 19 in which the basket is suspended, so that the cage will not transmit forces due to unbalance of the rotating system to the bearings or the framework of the machine.

In diagram form Fig. 8 shows the change in these forces which takes place when the displacement *a* of the basket 20 and the displacement *b* of the counterweight 11 increase. In this diagram $Uo$ is the original unbalance which increases as the basket is displaced out of concentricity with the axis of revolution of cage 19. The lower part of the diagram shows the simultaneous increase in the countervailing unbalance (centrifugal force) generated by the counterweight 11 with increasing displacement *b*, plotted on a scale reduced in proportion with the lever ratio $l_2/l_1$. The total restoring force, indicated by $R_{ges}$, of springs 37 limits—at the point of intersection of the lines representing $Ut+2Ug$ and $R_{ges}$—the interdependent displacements *a* and *b* to the value determined by the vertical dotted line, so that the force acting on the springs is $Ut+2Ug$ and the balancing force $Ug$ is exactly equal to $Ut$.

It will at once be appreciated that if the initial unbalance $Uo$ is greater or less a state of equilibrium—at some other point in the diagram—must be reached in which again the forces due to the unbalance of basket and counterweight compensate. Friction in the transmission mechanism between basket 20 and counterweight 11 may slightly modify the prevailing conditions but the remaining residual out-of-balance forces are so small that they cannot have a disturbing effect. A certain amount of damping is actually a desirable feature to prevent the build-up of resonant oscillations.

Since the compensation of unbalance is entirely automatic there will be an immediate restoration of equilibrium if at any time during the centrifugal drying process the unbalance of the charged basket should change. Such changes might be produced for instance by a reduction in the weight of the washing due to the removal of moisture or by a shift in the position of the washing inside the basket.

When assembling a washing machine of the kind illustrated in Figs. 1 to 6 attention need merely be given to the correct design and adjustment of the member 7 or springs 34 (in Fig. 6) or 37 (in Fig. 7) to ensure that the restoring forces will, during displacements of the basket, rise more steeply than the centrifugal forces engendered by the displacement of basket and counterweights.

In the embodiments illustrated in Figs. 1 to 6 the counterweights are embodied in preferably ring-shaped plates located at each end of the revolving basket, whereas the double-armed levers which provide the counterconnecting linkage between basket and weights are located around the peripheral edge of the basket.

It will be readily understood that the same effect could be achieved if only one such lever were flexibly attached to the centre of each end face of the basket and extended in the axial direction with its fulcrum located in the axis of revolution of the intermediate member, the free end of each lever carrying one counterweight.

It is also possible to use only a single compensating weight, if the two compensating weights, each arranged at a respective one of the two ends of the laundry basket, are replaced by one compensating weight formed as a hollow cylinder and disposed between the outer peripheral surface of the basket 4 and cage 3. The two ends of this compensating weight are likewise connected to the two ends of the basket through the intermediary of two-armed levers which—exactly as in the embodiments described with reference to Figures 1 to 6—are pivotally supported on the cage 3, and of which the short lever arms are pivotally connected to the ends of the basket and the longer lever arms are pivotally connected to the ends of the cylindrical compensating weight.

This construction also permits radial deflection of the two ends of the cylinder to take place largely independently of one another, so that even out-of-balance weights non-uniformly distributed along the axial length of the basket can be compensated.

An arrangement of this kind is diagrammatically illustrated in Figure 8*a* which shows the horizontal basket 4′, the driven cage 3′ formed as a drum, the two-armed transmission levers 8′ and the support pivots 9′ of the levers 8′; these pivots are mounted on brackets 10 which are secured to the cage 3′. The single compensating weight 11′ is formed as a hollow cylinder which is radially movable within the free space between the basket 4′ and the cage 3′ by means of the levers 8′.

Such an arrangement will likewise have the effect of compensating a non-uniform distribution of weight in the basket causing an eccentric displacement thereof by the resultant appropriate opposing eccentric displacement of the two ends of the cylindrical counterweight.

Figures 9 to 12 illustrate an embodiment of the invention in which a horizontal washing basket 38 is located inside a cage 39 and comprises two T-section thrust rings 41 with their webs secured to the cylindrical shell 40 of the basket 38, said rings co-operating with two inwardly open U-section rings 43 containing tubular tyres 44 made of an elastically yielding material and filled with a liquid or heavy medium 45 exhibiting the properties of a liquid. The liquid medium 45 completely fills the flexible tubular tyres 44 under slight pressure. The thrust rings 41 of the washing basket 38 bear against the flexible tyres 44 and in view of the displaceability of the medium 45 inside the tyres 44 and the natural flexibility of the tyres themselves, the washing basket will be suspended in an elastically yieldable manner inside the cage 39. The drive shaft 5 of the cage 39 runs in a bearing 46 which is firmly mounted in the frame (not shown) of the washing machine.

If the cage 39 and hence the washing basket 38 are rotated at high speed, then any unbalance of the washing basket 38 will cause the latter to be radially displaced and the liquid medium 45 inside the deformed tubular tyres 44 will be likewise displaced and forced to accumulate in the tyres at a point diametrically opposite the side to which the basket 38 has been eccentrically displaced by an amount *a* (cf. Figure 10). This enforced displacement of the liquid medium 45 inside the deformed flexible tyres 44 constitutes a compensating mass displacement which is similar in effect to the displacement of a counterweight through a comparatively high lever ratio. When the tyres, which are prevented from expanding radially outwards and laterally because they are contained in the channel of the U-section rings, are compressed by any eccentric displacement of the washing basket 38 and relieved of the compressional load on the side of the basket diametrically opposite, so that they can expand inwards in this latter region, the fluid contained therein will be forced, contrary to the action of the centrifugal forces, to move to the side opposite that where the excess weight in the basket is located, in such manner that the centre of gravity of the liquid will be shifted by an amount exceeding the displacement of the centre of gravity of the basket.

If the internal diameter of the U-section rings 43 is arranged to be about 10% greater than the external diameter of the flanges of the T-section thrust rings 41, then—as can be easily ascertained by an elementary calculation—a displacement *a* of the washing basket will cause a displacement of the centre of gravity of the fluid 45 by about $5a$ equivalent to a lever ratio of a transmission between the relative displacements of about 1:5.

Conveniently the flexible tubular tyres 44 should consist of a rubber-elastic material which is not affected by hot washing liquors nor susceptible to corrosion, such as silicone rubber.

For transmitting the torque from the cage 39 to the washing basket 38 suitable coupling elements may be provided, preferably of a nature permitting a certain degree of tangential flexibility.

Figures 11 and 12 illustrate an embodiment in which the washing basket 38 is held in position by a displaceable medium 45 contained in tubular tyres, and in which the cage 39 is in the form of a framework consisting of three axially parallel rods, the U-section rings 43 being secured to said rods 47 which are bolted to a flange 48 through which the assembly is driven. The mode of action of the assembly corresponds exactly with that already described by reference to Figures 9 and 10.

Figure 13 illustrates a form of construction in which the washing basket 49 is coupled with two annular counterweights 11 by means of two lever assemblies each comprising a set of circularly pitched double-armed levers 8. The fulcrums 9 of the double-armed levers 8 are located on internal flanges of the cage 50 and the elastic locating members which generate the restoring forces for urging the basket 49 and the counterweights 11 back into central position are embodied in elastically yielding rings 51 which, in contradistinction to the arrangement illustrated in Figures 1 to 7, act on the longer arms of the double-armed levers 8. This example has been described to illustrate the fact that the elastic locating means for the washing basket 49 need not necessarily be arranged directly between the basket 49 and the cage 50, and that they can with equal effect be disposed to bear on the counterweights 11 or the double-armed levers 8.

Finally, Figure 14 shows a washing basket 52 in cross-section which is provided with four tanks 53, angularly spaced equidistantly around the periphery of the basket, said tanks being filled with a mass-compensating liquid, such as water, before the washing machine is started up. The washing basket 52 is located inside the cage 54 by yielding members identical with the members 7 illustrated in Figs. 1 and 3. The tanks 53 are fitted with relief valves 55 which project radially outwards from basket 52 and face actuating cam elements 56 on the inside surface of the cage 54. When in operation the washing basket 52 is radially deflected against the action of its resilient supports, in the manner illustrated in Figure 3 with reference to the washing basket 4, the relief valves 55 on that side of the basket towards which the radial deflection has taken place (and on which the out-of-balance weight is located) are pressed against the actuating cams 56 and thereby opened. Liquid can now flow, under the action of centrifugal force, out of those liquid containers on which these opened valves are mounted; this outflow of liquid continues until the reduction of the quantity of liquid on the side of the basket where the out-of-balance weight is located has produced compensation of the out-of-balance forces and the basket has again resumed its position coaxial with the cage 54; in this position, the valves 55 close again.

In this form of construction of the means for compensating unbalance it is again the employment of the driven intermediate member embodied in the cage 54 which permits the position and magnitude of the out-of-balance weight to be used for shifting the centre of gravity of the liquid contained in the compensating tanks 53 until the unbalance has been compensated by a suitable application of the principle of static balancing.

The above description of different embodiments of the invention will have illustrated that the provision of a carrier cage, which transmits the torque to the washing basket and one or several counterweights suspended therein is of decisive importance to the performance of the invention. This cage constitutes the "relatively stationary member" of the revolving system of the washing machine, which carries the washing basket and the compensating weight or weights as well as coupling elements between basket and weight or weights for compensating unbalance by opposed eccentric displacement. The cage also carries the restoring elements which urge the displaceable members back into central position in relation to the axis of revolution of the cage as soon as the revolving body such as the basket, ceases to be out of balance or rotation is stopped.

I claim:

1. A centrifugal machine comprising a machine frame, a carrier cage mounted in said frame for rotation about an axis fixed relatively to said frame, driving means operatively connected to said cage and adapted to rotate said cage about said axis, a rotary body accommodated within said cage, compensating weight means, at least one lever pivoted to the cage and having a first arm connected to one axial end of the rotary body and a second arm connected to the compensating weight means, at least one lever pivoted to the cage and having a first arm connected to the other axial end of the rotary body and a second arm connected to the compensating weight means, and elastically yielding locating members operatively connected to said cage and said body and adapted to urge said body into a position of concentricity with said axis, whereby said body and weight means are carried only by said cage and rotate synchronously with said cage, and said body can undergo resilient radial deflection from said position whereupon said levers positively deflect said weight means in a direction opposite to that of the deflection of said body, and the deflection of said weight means is proportional to the deflection of the body.

2. A laundry machine comprising a machine frame, a carrier cage mounted in said frame for rotation about an axis fixed relatively to the frame, driving means operatively connected to said cage and adapted to rotate said cage about said axis, a washing basket accommodated within said cage, compensating weight means, at least one lever pivoted to the cage and having a short arm connected to one axial end of the washing basket and a long arm connected to the compensating weight means, at least one lever pivoted to the cage and having a short arm connected to the other axial end of the washing basket and a long arm connected to the compensating weight means, and elastically yielding locating members operatively connected to said cage and said body and adapted to urge said body into a position of concentricity with said axis, whereby said basket and weight means are carried only by said cage and rotate synchronously with said cage, and said basket when asymmetrically loaded with laundry can undergo resilient radial deflection from said position, whereupon said levers positively deflect said weight means in a direction opposite to that of the deflection of said basket, and the deflection of said weight means is proportional to that of the basket but larger in accordance with the leverage.

3. A laundry machine comprising a machine frame, a carrier cage mounted in said frame for rotation about an axis fixed relatively to the frame, driving means operatively connected to said cage and adapted to rotate said cage about said axis, a washing basket accommodated within said cage, a first rigid annular compensating weight, at least one lever pivoted to the cage and having a short arm connected to one axial end of the washing basket and a long arm connected to said first weight, a second rigid annular compensating weight, at least one lever pivoted to the cage and having a short arm connected to the other axial end of the basket and a long arm connected to said second weight, and elastically yielding locating members operatively connected to said cage and said body and adapted to urge the basket into a position of concentricity with said axis, whereby said basket and weights are carried only by the cage, and said basket when asymmetrically loaded with laundry can undergo resilient radial deflection from said position, whereupon said levers positively deflect said weights independently of one another in a direction opposite to that of the deflection of the basket, the deflection of the weights being proportional to that of the basket but larger in accordance with the leverage.

4. A laundry machine comprising a machine frame, a carrier cage mounted in said frame for rotation about an axis fixed relatively to the frame, driving means operatively connected to said cage and adapted to rotate said cage about said axis, a rotary basket accommodated within said cage, a hollow cylindrical compensating weight arranged between the peripheral surfaces of the cage and of the basket, at least one lever pivoted to the cage and having a short arm connected to one axial end of the basket and a long arm connected to one axial end of the weight, at least one lever pivoted to the cage and having a short arm connected to the other axial end of the basket and a long arm connected to the other avial end of the weight, and elastically yielding locating members operatively connected to said cage and said body and adapted to urge the basket into a position of concentricity with the said axis, whereby said basket and weight are carried only by said cage and rotate synchronously with the cage, and said basket when asymmetrically loaded with laundry can undergo resilient radial deflection from said position, whereupon said levers positively deflect said weight in a direction opposite to that of the deflection of the basket, and the deflection of the weight is proportional to that of the basket but larger in accordance with the leverage.

References Cited in the file of this patent

UNITED STATES PATENTS

| | | |
|---|---|---|
| 322,069 | Rothe | July 14, 1885 |
| 1,754,252 | Altorfer | Apr. 15, 1930 |
| 1,782,561 | Boldizsar | Nov. 25, 1930 |
| 1,970,377 | Heisler | Aug. 14, 1934 |
| 2,130,160 | Schellenberg | Sept. 13, 1938 |
| 2,356,818 | Bruckman | Aug. 29, 1944 |
| 2,361,266 | Clark | Oct. 24, 1944 |
| 2,442,397 | Candor | June 1, 1948 |
| 2,471,217 | Johnson | May 24, 1949 |
| 2,525,781 | De Remer | Oct. 17, 1950 |
| 2,831,369 | Cahn | Apr. 22, 1958 |

FOREIGN PATENTS

| | | |
|---|---|---|
| 732,706 | Great Britain | June 29, 1955 |